United States Patent Office 3,170,929
Patented Feb. 23, 1965

3,170,929
DERIVATIVES OF DIBENZO[c,f][1,2]DIAZEPINE
AND DIBENZO[c,g][1,2]DIAZOCINE
Harman S. Lowrie, Northbrook, Ill., assignor to G. D.
Searle & Co., Chicago, Ill., a corporation of Delaware
No Drawing. Filed Mar. 23, 1961, Ser. No. 97,737
7 Claims. (Cl. 260—310)

The present invention relates to a novel group of compounds which are derivatives of dibenzo[c, f][1,2] diazepine and dibenzo [c,g][1,2]diazocine. More particularly, the compounds of this invention can be represented by the following general formula

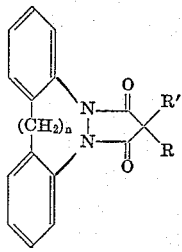

wherein $n$ is a positive integer less than 3; R is a member of the group consisting of hydrogen, lower alkyl, phenyl, and phenyl(lower alkyl); and R' is a member of the group consisting of hydrogen and lower alkyl. The lower alkyl radicals in the above formula contain less than 7 carbon atoms. Typically, R can be hydrogen, methyl, ethyl, butyl, phenyl or benzyl while R' can be hydrogen, ethyl, or butyl.

The compounds of this invention are useful because of their antibacterial activity. More specifically, they inhibit the growth of *Diplococcus pneumoniae*.

To prepare the claimed compounds, an appropriate starting material of the formula

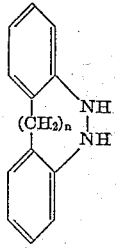

wherein $n$ is defined as above, is mixed with a malonyl dihalide at a temperature of 0 to —40° C. in the presence of a strong organic base. Especially suitable are such tertiary amines as pyridine, alkylated pyridines or trialkylamines. An aromatic hydrocarbon or a halogenated hydrocarbon such as methylene chloride or chloroform is a convenient inert organic solvent suitable for the reaction.

The intermediate hydrazo compounds described above can be prepared from a dinitro compound of the formula

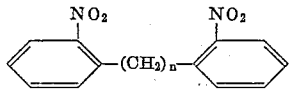

wherein $n$ is defined as above. In a typical procedure, 50 parts of barium hydroxide octahydrate in 400 parts of hot water is added to 0.1 mole of the above dinitro compound in 1580 parts of hot ethanol. The mixture is refluxed and 44 parts of zinc dust is added portionwise. After being refluxed for an additional 30 minutes, the mixture is filtered and the solid is washed with hot ethanol. Thirty parts of mercuric oxide is added to the combined filtrates and the warm mixture is stirred for 30 minutes before it is saturated with carbon dioxide. After the addition of infusorial earth, the mixture is filtered and the solvent is removed from the filtrate while the temperature is not allowed to rise above 50° C. The residue is dissolved in 2130 parts of ether, and the resultant solution is washed first with dilute potassium hydroxide and then with water before it is dried over potassium carbonate and concentrated. On cooling, there precipitates an azo compound having the following general formula

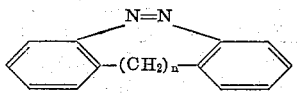

A mixture is prepared from 0.00175 mole of the above azo compound and 0.5 part of hydrazine in 142 parts of boiling ether and 0.02 part of platinum oxide is added portionwise to the hot solution. Heating is continued until a colorless solution is obtained and ether is added to maintain the volume of the solution. When the reaction is complete, the mixture is concentrated under nitrogen to incipient precipitation of the dissolved solid before it is cooled and filtered to give the substituted hydrazine. The following compounds are obtained in this way:

5,6-dihydro-11H-dibenzo[c,f][1,2]diazepine melting at about 99–100° C.

5,6,11,12 - tetrahydrodibenzo[c,g][1,2]diazocine melting at about 151° C.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weights, except as otherwise noted.

*Example 1*

To a solution of 4.9 parts of pyridine in 268 parts of methylene chloride is added at —40° C. under a nitrogen atmosphere 2.5 parts of butylmalonyl dichloride with stirring. This is followed by the addition of 2.4 parts of 5,6-dihydro-11H-dibenzo[c,f][1,2]diazepine in 134 parts of methylene chloride. The solution is allowed to stand overnight at 0° C. It is washed with dilute hydrochloric acid, dried over anhydrous sodium sulfate and the solvent is removed under reduced pressure while the temperature is maintained below 40° C. The oily residue is dissolved in ether-dilute potassium hydroxide solution and the ether layer is extracted with dilute potassium hydroxide. After treatment with activated charcoal, the combined aqueous layers are made acid with dilute hydrochloric acid. The resultant mixture is extracted with ether and the ether solution is dried and concentrated. Upon cooling the ether solution, there is obtained 2-butyl- 1,3 - dioxo - 1,2,3,3a,8,12b - hexahydrodibenzo[c,f]pyrazolo-[1,2-a][1,2]diazepine melting at about 176–177° C. This compound has the following formula

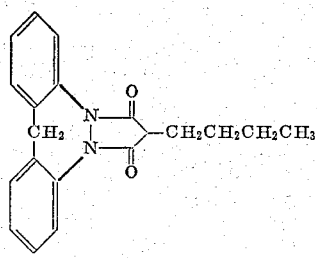

*Example 2*

A solution of 4.2 parts of butylmalonyl dichloride in 335 parts of methylene chloride is added to a mixture of 4.9 parts of pyridine and 4 parts of 5,6,11,12-tetrahydrodibenzo[c,g][1,2]diazocine in 100 parts of methylene chloride at —40° C. with stirring under a nitrogen atmosphere. After standing overnight at 0° C., the mixture is washed with dilute hydrochloric acid and dried over anhydrous sodium sulfate and the solvent is evaporated under reduced pressure while the temperature is maintained below 40° C. The residual material is treated with ether and extracted with two portions of dilute potassium hydroxide. After treatment with activated charcoal, the alkaline solution is acidified with dilute hydrochloric acid. This mixture is extracted with ether and the ether layer is dried, concentrated and cooled to yield 2-butyl-1,3-dioxo-2,3,3a, 8,9,13b - hexahydro-1H-dibenzo[c,g]pyrazolo[1,2-a][1,2]diazocine melting at about 122–125° C. and having the following formula

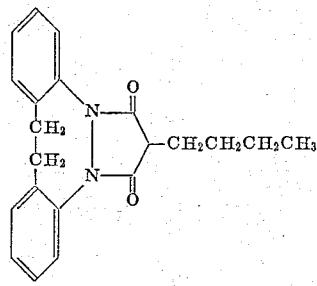

*Example 3*

At a temperature of —40° C. under a nitrogen atmosphere 2.7 parts of ethylmalonyl dichloride is added to 3.9 parts of pyridine in 268 parts of methylene chloride with stirring. This is followed by the addition of 3 parts of 5,6,11,12-tetrahydrodibenzo[c,g][1,2]diazocine in 268 parts of methylene chloride. After standing overnight at 0° C. the mixture is washed with dilute hydrochloric acid and dried over anhydrous sodium sulfate. The solvent is removed under reduced pressure and the residue treated with a mixture of ether and dilute potassium hydroxide. The suspension resulting from acidification of the aqueous layer is extracted with ether and the ether layer is dried, concentrated and cooled to yield 2-ethyl-1,3-dioxo-2,3,3a, 8,9,13b - hexahydro - 1H - dibenzo[c,g]pyrazolo[1,2 - a][1,2]diazocine melting at about 160–164° C.

*Example 4*

A mixture of 3.9 parts of pyridine in 268 parts of methylene chloride is cooled to —40° C. in an acetone-Dry Ice bath under a nitrogen atmosphere. After the introduction of 4.8 parts of benzylmalonyl dichloride into the solution, 4.2 parts of 5,6,11,12-tetrahydrodibenzo[c,g][1,2]diazocine in 134 parts of methylene chloride is added. The solution is allowed to stand at 0° C. overnight. It is washed with dilute hydrochloric acid and dried and the solvent is evaporated under reduced pressure. The residue is recrystalized from methanol to give 2 - benzyl - 1,3 - dioxo - 2,3,3a,8,9,13b - hexahydro - 1H- dibenzo [c,g]pyrazolo[1,2-a][1,2]diazocine melting at about 238–241° C.

*Example 5*

At —40° C. under nitrogen 4.2 parts of diethylmalonyl dichloride is added to 4.9 parts of pyridine and 268 parts of methylene chloride with stirring. A solution of 4.0 parts of 5,6,11,12-tetrahydrodibenzo[c,g][1,2]diazocine in 100 parts of methylene chloride is added. After standing overnight at 0° C. the solution is washed with dilute hydrochloric acid and dried over anhydrous sodium sulfate. The solvent is evaporated under reduced pressure and the residue is recrystallized from ether to yield 2,2-diethyl - 1,3 - dioxo - 2,3,3a,8,9,13b - hexahydro - 1H-dibenzo[c,g]pyrazolo[1,2 - a][1,2]diazocine.

If an equivalent quantity of dibutylmalonyl dichloride is substituted for the diethylmalonyl dichloride in the above procedure, the product is 2,2-dibutyl-1,3-dioxo-2, 3,3a,8,9,13b - hexahydro - 1H - dibenzo[c,g]pyrazolo[1, 2-a][1,2]diazocine.

*Example 6*

To 7.8 parts of pyridine in 402 parts of methylene chloride is added at —40° C. under nitrogen with stirring 5.4 parts of phenylmalonyl dichloride. Four parts of 5,6-dihydro-11H-dibenzo[c,f][1,2]diazepine in 201 parts of methylene chloride is subsequently added. After stirring overnight at 0° C., the mixture is washed with dilute hydrochloric acid and dried. Evaporation of the solvent under reduced pressure yields a crude product which is recrystallized from benzene to give 2-phenyl-1,3-dioxo-1,2,3,3a,8,12b - hexahydrodibenzo[c,f]pyrazolo[1,2 - a][1, 2]diazepine.

A solution of 7.8 parts of pyridine in 402 parts of methylene chloride is cooled in an acetone-Dry Ice bath under nitrogen and 5.4 parts of phenylmalonyl dichloride is added with stirring at —40° C. This is followed by the addition of 4.2 parts of 5,6,11,12-tetrahydrodibenzo-[c,g][1,2]diazocine in 201 parts of methylene chloride. The solution is allowed to stand overnight at 0° C. before it is washed with dilute hydrochloric acid and dried. The solvent is removed under reduced pressure at a temperature below 40° C. and the residue is recrystallized from benzene to yield 2-phenyl-1,3-dioxo-2,3,3a,8,9,13b-hexahydro-1H-dibenzo[c,g]pyrazolo[1,2-a][1,2]diazocine melting at about 185–190° C. This compound has the following formula

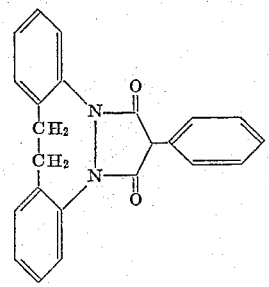

What is claimed is:

1. A compound of the formula

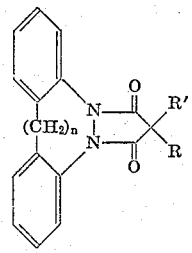

wherein $n$ is a positive integer less than 3; R is a member of the group consisting of hydrogen, lower alkyl, phenyl, and phenyl(lower alkyl); and R' is a member of the group consisting of hydrogen and lower alkyl.

2. A compound of the formula

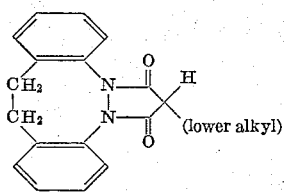

3. 2 - butyl - 1,3 - dioxo - 1,2,3,3a,8,12b - hexahydrodibenzo[c,f]pyrazolo[1,2-a][1,2]diazepine.
4. T - ethyl - 1,3 - dioxo - 2,3,3a,8,9,13b - hexahydro-1H-dibenzo[c,g]pyrazolo[1,2-a][1,2]diazocine.
5. 2 - butyl - 1,3 - dioxo - 2,3,3a,8,9,13b - hexahydro-1H-dibenzo[c,g]pyrazolo[1,2-a][1,2]diazocine.
6. 2 - phenyl - 1,3 - dioxo - 2,3,3a,8,9,13b - hexahydro-1H-dibenzo[c,g]pyrazolo[1,2-a][1,2]diazocine.
7. 2 - benzyl - 1,3, - dioxo - 2,3,3a,8,9,13b - hexahydro-1H-dibenzo[c,g]pyrazolo[1,2-a][1,2]diazocine.

References Cited in the file of this patent
FOREIGN PATENTS

| | | |
|---|---|---|
| 1,162,118 | France | Apr. 8, 1958 |
| 1,163,358 | France | Apr. 28, 1958 |
| 646,597 | Great Britain | Nov. 22, 1950 |